Aug. 22, 1939.  R. W. ALBRIGHT  2,170,441
METHOD FOR MAKING RUBBER STRIPS
Filed Oct. 5, 1933
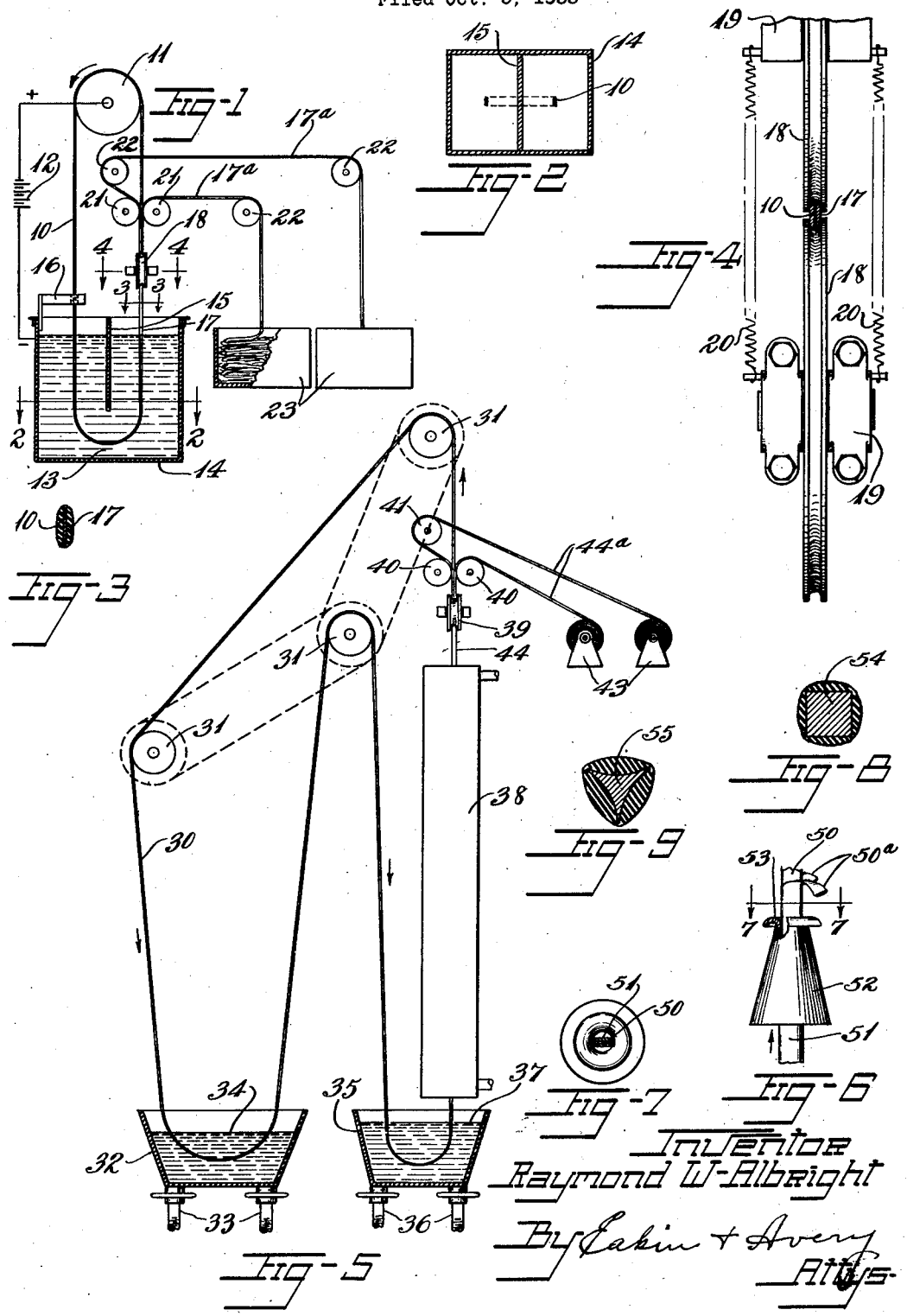

Patented Aug. 22, 1939

2,170,441

UNITED STATES PATENT OFFICE 2,170,441

METHOD FOR MAKING RUBBER STRIPS

Raymond W. Albright, Akron, Ohio, assignor to American Anode Incorporated, Akron, Ohio, a corporation of Delaware Application October 5, 1933, Serial No. 692,303

3 Claims. (Cl. 18—54)

This invention relates to elastic rubber strips such as the rubber thread used in making stretchable garments and the wider rubber bands used in winding golf balls, and to method and apparatus for making such rubber strips.

Briefly, the method of the present invention comprises forming a rubber tube, preferably by depositing rubber from a liquid rubber dispersion upon a forming strip of suitable cross-sectional configuration, and then, before or after drying and vulcanizing the rubber, separating the rubber tube longitudinally to produce rubber strips having more or less rounded cross-sectional outlines.

This novel method will be described in greater detail with reference to the accompanying drawing illustrating apparatus suitable for carrying out the method.

In the drawing, all of which are diagrammatic,

Fig. 1 is an elevation, partially in section, of one form of apparatus for manufacturing rubber strips, employing electrophoretic means for forming the tubular rubber deposit.

Fig. 2 is a vertical section taken on line 2—2 of Fig. 1.

Fig. 3 is an enlarged vertical section taken on line 3—3 of Fig. 1 showing the rubber tube upon the forming strip.

Fig. 4 is an enlarged vertical section on line 4—4 of Fig. 1, illustrating details of severing means for longitudinally separating the rubber tube.

Fig. 5 is an elevation, partially in section, of a modified form of apparatus for manufacturing rubber strips, employing a chemical coagulant to facilitate forming a tubular rubber deposit upon the forming strip, and embodying the same severing means as shown in the apparatus of Fig. 1.

Fig. 6 is an elevation of a modified form of apparatus for severing the rubber tube.

Fig. 7 is a vertical section taken on line 7—7 of Fig. 6.

Fig. 8 is a cross-sectional view of a square forming strip with a tubular rubber deposit thereon.

Fig. 9 is a similar view of a substantially triangular forming strip having concave faces, with an enveloping tubular rubber deposit thereon.

The apparatus illustrated in Fig. 1 comprises an endless electro-conductive forming strip 10, preferably consisting of zinc or zinc coated ferrous metal in the form of a thin tape, for example about $\frac{1}{16}''$ wide, the endless tape being looped over a driven electro-conductive pulley 11 connected to the positive terminal of a source of direct current 12. The lower portion of the looped tape is immersed in a body of a coagulable aqueous dispersion of rubber 13, preferably compounded latex, contained in a rectangular metallic tank 14 connected to the negative terminal of the source of current, the tank being provided with a central vertical metallic baffle 15 disposed between the two reaches of the looped tape to provide cathode surfaces about all faces thereof. An insulated slotted guide 16 may be provided about the descending reach of the forming tape just above the point of its entrance into the aqueous dispersion to prevent whipping of the tape as it travels downward.

Thus, as the forming tape travels in its natural looped path through the aqueous dispersion, the direct current being connected as described, rubber and other negatively charged particles suspended in the aqueous dispersion will, under the influence of the current, migrate toward and deposit upon the anodic surface of the tape to form a continuous envelope of plastic and easily deformable water-containing rubber coagulum 17 of generally ovate cross sectional outline upon and about the forming tape. In making thin bands and threads, a sufficiently heavy deposit may be produced upon the forming strip simply by passing it slowly through a highly concentrated or thickened latex, without resort to electrophoretic means for facilitating the deposition, in which cases, the electrical connections may be disconnected or eliminated entirely.

After the forming tape and the associated enveloping coating of rubber coagulum leaves the dispersion tank travelling upward, and preferably before any substantial drying of the coagulum has occurred, it is passed promptly between a pair of radially aligned sheaves 18, 18 which are disposed with their common axial plane at right angles to the plane of the forming tape, with their central radial planes aligned with the plane of the tape, and with their peripheries in closely relationed opposed positions, the distance between the bottoms of the grooves in the common axial plane of the two sheaves being approximately equal to the width of the forming tape. The sheaves are rotatably mounted upon suitable bearings and supports 19, 19, at least one of which is slidably mounted, and resiliently urged toward the other as by coil springs 20. The grooves in the sheaves preferably are of such configurations that the space between the sheaves defined in their common axial plane by the grooves is that of a flattened ellipse the major axis of which is substantially equal to the width of the tape and the minor axis of which is equal to or slightly greater than the overall thickness of the tape and coagulum, although considerable variation in the configuration of the grooves is possible.

Thus, it will be seen that as the coagulum-coated tape passes between the sheaves, it will be maintained in substantial alignment with the central radial plane of the sheaves which serve to press the deformable coagulum against the thin and relatively sharp edges of the tape and thereby to sever the coagulum along these edges to produce two separate strips of coagulum 17a, 17a, which are removed from the forming tape by a pair of stripping rollers 21, 21, and then led over guide rolls 22, 22, to boxes 23, to be dried and vulcanized in any conventional manner, or they may be directed through a continuous dryer and vulcanizer or otherwise finished as may be desired.

Rubber strips produced in accordance with this invention have a more or less rounded cross-sectional outline and have smoothly rounded edges which render them superior for many purposes to strips having square cut corners produced by prior methods in which strips are cut from a sheet of rubber.

A second form of apparatus, illustrated in Fig. 5 comprises an endless forming strip 30 similar to the strip previously described, which is caused to travel over a series of driven rolls 31 which are so arranged and speeded as to cause the strip in its travel to form two substantially vertical loops. About the lower portion of the first loop is provided a tank 32 provided with elevating means which may be simple screw jacks 33. This tank 32 is filled with a fluid coagulant solution 34, preferably a solution of a polyvalent metal salt such as calcium chloride, calcium nitrate, zinc chloride, zinc nitrate, zinc acetate, etc., dissolved in a volatile organic solvent such as alcohol, acetone, chloroform, etc., although other materials capable of coagulating an aqueous rubber dispersion may be employed. About the lower portion of the second loop is provided a tank 35 mounted, like the tank 32 upon elevating means 36. The tank 35 is filled to a convenient depth with an aqueous dispersion of rubber 37, preferably compounded latex. A vertical tunnel heater 38 of conventional design, adapted to function either as a dryer or as a dryer and vulcanizer, is provided about the ascending reach of the second loop of the forming strip. Above the dryer and vulcanizer are provided a pair of sheaves 39, arranged as described in connection with Fig. 1, stripping rollers 40, 40, a guide roll 41 and conventional windup mechanisms 43, 43.

In operating the second form of apparatus, the forming strip in its continuous travel passes first through the coagulant solution where it acquires a thin coating of the coagulant composition which is dried by evaporation of the volatile solvent during subsequent travel of the strip to form a substantially non-flowing coagulant coating upon the forming strip. The coated strip then passes through the latex where an enveloping tubular coating of rubber 44 is coagulated upon the strip, and the rubber is dried or dried and vulcanized in the tunnel heater. The dried or dried and vulcanized rubber tube then is severed along the edges of the forming strip by passing between the pair of sheaves in the manner described above, and the two severed strips 44a, 44a, are removed from the forming strip and are wound upon a reel to be vulcanized in case they were only dried theretofore, or they may be otherwise treated as desired. When chemical coagulants are used to facilitate deposition of rubber upon the forming strip as in the second form of apparatus, the rubber deposit upon the sharp edges of the strip usually is relatively thinner, apparently because the coagulant while still fluid flows away from these edges, so that the rubber tube, even though dried and vulcanized, may be cut readily by the sheaves pressing against the edges of the strip.

Other means of pressing the rubber deposit against the cutting edges of the strip may be devised. For example, a thin flat metallic strip 50 having an enveloping coating of rubber 51 may be drawn through a round opening having a diameter slightly less than the width of the forming strip, as in the device illustrated in Figs. 6 and 7. This device comprises a frusto-conical metallic die 52 having its smaller end turned outward and rolled to provide curved pressure surfaces 53. As the rubber covered forming strip is drawn through the die, the rubber will be severed by the edges of the strip pressing against the curved surface of the die, to produce two strips 50a, 50a.

Although only a thin flat tape-like forming strip has been hereinabove described, it is obvious that strips having more than two faces may be used, as for example, the square strip 54 of Fig. 8 and the substantially triangular strip 55 of Fig. 9, in which the corners of the strips provide the required cutting edges between the several faces of the strips. The edges of these strips, as well as of the flat tape, may be sharpened to provide keener cutting edges, although this usually will be unnecessary. The faces of the strip may be made concave as in the triangular strip of Fig. 9 in which case, the finished rubber strip will be more nearly circular than otherwise would be true. Sheaves having grooves of such configurations that suitable surfaces will be provided to press against the several cutting edges of the multi-faced strips may employed, or a separate sheave may be provided to press against each of the several cutting edges.

In addition to the several methods employing a liquid dispersion of rubber hereinabove specifically mentioned, the forming strip may be coated with rubber by an extrusion process employing solid masticated rubber, or in other manners which will occur to the skilled artisan.

The present invention provides a simple, rapid, and relatively inexpensive method for continuously making large quantities of strip rubber of uniformly high quality. It is especially well adapted to make relatively wide bands having gently rounded outlines, although threads of approximately equal width and thickness may be made by providing forming strips of suitable dimensions and varying the thickness of the rubber deposit. Threads and strips made directly from latex in the manner described exhibit the superior properties of high tensile strength, toughness, and excellent ageing, characteristic of latex rubber.

The term "liquid dispersion of rubber" has been employed in the appended claims in a generic sense to include all flowable dispersions of caoutchouc gutta-percha, balata, and like natural or synthetic gums or resins, whether vulcanized or unvulcanized, and whether the rubber is dispersed in water or in an organic solvent, as well as natural latices of rubber. The dispersions may be concentrated, diluted, thickened, thinned, or otherwise modified and may contain any desirable compounding or treating ingredients.

Numerous modifications may be made in details of the invention as hereinabove described without departing from the scope of the discovery as defined in the appended claims.

I claim:

1. The method which comprises continuously passing a surface through an aqueous dispersion of rubber, depositing a continuous coating of water-containing rubber coagulum thereon, severing the coating longitudinally into strip form promptly and before substantial drying of the coagulum has occurred, and drying the strips of coagulum.

2. The method which comprises forming from an aqueous dispersion of rubber a tubular deposit of water-containing rubber coagulum, severing the tubular coagulum into strip form promptly and before substantial drying thereof has occurred, and drying the severed strips of coagulum.

3. The method of making a rubber product in thread, band or strip form, which comprises progressively associating a wire-like forming strip with an aqueous dispersion of rubber to deposit thereon an enveloping coating of water-containing rubber coagulum constituting a tubular deposit, promptly severing the tubular deposit longitudinally and in a progressive manner along at least one continuous path, progressively removing the severed deposit from the forming strip, and drying the removed deposit, the severing of the tubular deposit being effected before any substantial drying of the coagulum has occurred.

RAYMOND W. ALBRIGHT.